(12) United States Patent
Uchida et al.

(10) Patent No.: US 12,018,175 B2
(45) Date of Patent: Jun. 25, 2024

(54) SURFACE TREATMENT AGENT FOR METAL MATERIALS, METAL MATERIAL COATED WITH SURFACE TREATMENT FILM, AND METHOD FOR PRODUCING SAME

(71) Applicant: Nihon Parkerizing Co., Ltd., Tokyo (JP)

(72) Inventors: Junichi Uchida, Tokyo (JP); Yuki Haijima, Tokyo (JP); Yuki Sueuchi, Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 408 days.

(21) Appl. No.: 17/253,418

(22) PCT Filed: Jun. 28, 2019

(86) PCT No.: PCT/JP2019/025790
§ 371 (c)(1),
(2) Date: Dec. 17, 2020

(87) PCT Pub. No.: WO2020/004618
PCT Pub. Date: Jan. 2, 2020

(65) Prior Publication Data
US 2021/0115265 A1    Apr. 22, 2021

(30) Foreign Application Priority Data
Jun. 28, 2018    (JP) .................................. 2018-123269

(51) Int. Cl.
*C09D 1/02*    (2006.01)
*C09D 5/08*    (2006.01)
*C23C 24/00*    (2006.01)

(52) U.S. Cl.
CPC .................. *C09D 5/08* (2013.01); *C09D 1/02* (2013.01); *C23C 24/00* (2013.01)

(58) Field of Classification Search
None
See application file for complete search history.

(56) References Cited

U.S. PATENT DOCUMENTS

| 6,797,327 B1 | 9/2004 | Willis et al. |
| 2002/0086253 A1* | 7/2002 | Young ................... F23D 11/445 126/45 |
| 2010/0330282 A1 | 12/2010 | Nienburg et al. |
| 2013/0156958 A1* | 6/2013 | Belov ..................... C09D 5/00 427/372.2 |

FOREIGN PATENT DOCUMENTS

| CN | 106133192 A | * 11/2016 | ............... B21C 9/00 |
| EP | 2281789 | 9/2016 | |
| JP | H10110279 A | 4/1998 | |
| JP | 2003-145034 A | 5/2003 | |
| JP | 2004-035377 A | 2/2004 | |
| JP | 2005-298765 A | 10/2005 | |
| JP | 2015-505898 A | 2/2015 | |

OTHER PUBLICATIONS

Translation: CN-106133192-A; Hatakeyama T; Nov. 2016 (Year: 2016).*
Office Action DE Application No. 112019003224.0 dated Feb. 11, 2022, 16 pages.
Search Report in International Application No. PCT/JP2019/025790 dated Aug. 13, 2019, 1 page.

* cited by examiner

*Primary Examiner* — Humera N. Sheikh
*Assistant Examiner* — Elizabeth D Ivey
(74) *Attorney, Agent, or Firm* — MARSHALL, GERSTEIN & BORUN LLP

(57) ABSTRACT

The purpose of the present invention is to provide a surface treatment agent which is capable of forming, on a metal material, a film that not only comprehensively satisfies various performance such as corrosion resistance and adhesion but also exhibits excellent corrosion resistance and adhesion even when exposed to a high-temperature environment. The Problem is solved by a surface treatment agent for metal materials, which contains: a compound and/or mixture (A) represented by $M_2O \cdot SiO_2$, wherein a molar ratio of $SiO_2/M_2O$ is in a range of 1.8 to 7.0 and M represents an alkali metal; a stabilized zirconium oxide (B); and a component (C) that contains at least one selected from metal oxide particles and clay minerals except for the compound and/or mixture (A) and the stabilized zirconium oxide (B).

5 Claims, No Drawings

SURFACE TREATMENT AGENT FOR METAL MATERIALS, METAL MATERIAL COATED WITH SURFACE TREATMENT FILM, AND METHOD FOR PRODUCING SAME

TECHNICAL FIELD

The present invention relates to a surface treatment agent for metal materials, which is suitable for metal materials used in electronic components and microdevice components that are integrated into industrial products, such as automobiles, home electrical appliances and office-automation equipment; a metal material coated with a surface treatment film, which is obtained by surface treatment of a metal material coated with the surface treatment agent for metal materials; and a method of producing the same.

BACKGROUND ART

In industrial products such as automobiles, home electrical appliances, and office-automation equipment, metal materials are used for electronic components and microdevice components that constitute the products. These industrial products are used in a variety of environments, such as outdoor environments, seaside environments, and factory environments. Therefore, the metal materials used in these industrial products are required to be capable of enduring harsh environments including the above-described ones.

Recently, there is a demand for improved functionality and increased density in electronic components and microdevice components, and these components have been progressively reduced in size and microfabricated. Accordingly, technologies for forming a surface treatment film on the surface of a metal material have been developed for the purpose of protecting the metal materials used in such electronic components and microdevice components.

These technologies may take, for example, a mode of forming an organic surface treatment film on the surface of a metal material. Specifically, there are a mode of providing a surface treatment film mainly composed of an organic component, or a mode of forming an organic protective film using a sealing agent. More specifically, a method of forming a surface treatment film through self-deposition of a water-dispersible organic polymer resin on the surface of a metal material (Patent Document 1) may be employed. In addition, a method of forming an organic protective film using a sealing agent that contains a specific acrylic resin and an inorganic filler has been disclosed (Patent Document 2).

RELATED ART DOCUMENTS

Patent Documents

[Patent Document 1] Japanese Unexamined Patent Application Publication No. 2003-145034
[Patent Document 2] Japanese Unexamined Patent Application Publication No. 2005-298765

SUMMARY OF THE INVENTION

Problems to be Solved by the Invention

In recent years, metal materials are often used in harsher environments, therefore, there is an increasing demand for superior performance in surface treatment films. Particularly, those metal materials used in electronic components, microdevice components and the like may be exposed to a high-temperature environment during the production of the components or after being integrated into the vicinity of an automobile engine or the inside of an electronic device. Therefore, the surface treatment films of such metal materials are required to have excellent heat resistance in high-temperature environments and to exhibit excellent adhesion and water resistance.

In view of the above-described circumstances, an object of the present invention is to provide a surface treatment agent for metal materials, which is capable of forming, on the surface of a metal material, a surface treatment film that not only has excellent heat resistance in high-temperature environments but also exhibits excellent adhesion and water resistance.

Another object of the present invention is to provide a metal material having a surface treatment film, in which the surface treatment film is formed on the surface of the metal material using the above-described surface treatment agent for metal materials.

Means for Solving the Problems

That is, the present invention encompasses the followings.
(1) A surface treatment agent for metal materials, containing:
a compound and/or mixture (A) represented by $M_2O \cdot SiO_2$, wherein a molar ratio of $SiO_2/M_2O$ is in a range of 1.8 to 7.0 and M represents an alkali metal;
a stabilized zirconium oxide (B); and
a component (C) that contains at least one selected from metal oxide particles and clay minerals except for the compound and/or mixture (A) and the stabilized zirconium oxide (B).
(2) The surface treatment agent for metal materials according to (1), wherein
a content of the compound and/or mixture (A) is in a range of 42.8% by mass to 87.5% by mass with respect to a total solid content of the surface treatment agent,
a ratio (BM/AM) of a mass (BM) of the stabilized zirconium oxide (B) to a mass (AM) of the compound and/or mixture (A) is in a range of 0.08 to 0.5, and
a ratio (CM/AM) of a mass (CM) of the component (C) in the surface treatment agent to the mass (AM) is in a range of 0.08 to 0.5.
(3) The surface treatment agent for metal materials according to (1) or (2), wherein
the stabilized zirconium oxide (B) contains $CeO_2$ as a stabilizer, and
a mass ratio ($CeO_2/ZrO_2$) of $CeO_2$ to zirconium oxide ($ZrO_2$) is in a range of 0.01 to 1.0.
(4) The surface treatment agent for metal materials according to any one of (1) to (3), wherein a molar ratio of $SiO_2/M_2O$ in the compound and/or mixture (A) is in a range of 3.9 to 6.0.
(5) A metal material coated with a surface treatment film, including a film formed by contacting the surface treatment agent for metal materials according to any one of claims 1 to 4 with the surface of the metal material.
(6) A method of producing a metal material coated with a surface treatment film, the method including a step of attaching a film formed from the surface treatment agent for metal materials according to any one of (1) to (4) to a metal material.

Advantageous Effects of the Invention

According to the present invention, a surface treatment agent for metal materials which is capable of forming, on the surface of a metal material, a surface treatment film that not only has excellent heat resistance in high-temperature environments but also exhibits adhesion and water resistance even after being exposed to a high-temperature environment, can be provided.

DESCRIPTION OF EMBODIMENTS

The surface treatment agent for metal materials according to one embodiment of the present invention, a method of producing the same, and a metal material coated with a surface treatment film will now be described.

First, the surface treatment agent will be described.

The surface treatment agent for metal materials according to the present embodiment is a surface treatment agent which is capable of forming, for example, on the surface of a metal material, a film that not only comprehensively satisfies various performance such as corrosion resistance, adhesion and water resistance but also exhibits excellent corrosion resistance and adhesion even when exposed to a high temperature. The surface treatment agent for metal materials according to the present embodiment contains a prescribed compound and/or mixture (A), a stabilized zirconium oxide (B), and a component (C). It is noted here that the term "high temperature" used herein can mean a temperature of 200° C. or higher, 300° C. or higher, or 400° C. or higher.

The components contained in the surface treatment agent of the present embodiment will now be described.

<Compound and/or Mixture (A)>

The surface treatment agent of the present embodiment contains a prescribed compound and/or mixture (A). The compound and/or mixture (A) is a compound and/or mixture that contains an alkali metal oxide ($M_2O$) and silica ($SiO_2$), and is hereinafter represented by "$M_2O \cdot SiO_2$". The molar ratio ($SiO_2/M_2O$) of silica to the alkali metal oxide is in a range of 1.8 to 7.0, preferably in a range of 3.1 to 6.5, more preferably in a range of 3.9 to 6.0. This molar ratio is calculated from the ratio of raw materials of the alkali metal oxide and silica that are added in the preparation of the compound and/or mixture.

A method of producing the compound and/or mixture (A) is not particularly restricted, and any known method can be employed. For example, the alkali metal oxide and silica may be mixed to obtain a mixture, or a commercially available compound containing the alkali metal oxide and silica may be used. Examples of the alkali metal component M include metal components such as sodium, potassium, and lithium.

The content of the compound and/or mixture (A) in the surface treatment agent is not particularly restricted, however, it is preferably in a range of 42.8% by mass to 87.5% by mass, more preferably in a range of 53.8% by mass to 78.5% by mass, still more preferably in a range of 59.1% by mass to 73.9% by mass, with respect to a total solid content in the surface treatment agent.

It is noted here that the term "total solid content" used herein means a total amount of solids of the compound and/or mixture (A), the stabilized zirconium oxide (B) and the component (C), not including any volatile component such as a solvent.

A more preferred mode of the compound and/or mixture (A) is, for example, a mixture obtained by mixing an alkali metal silicate, in which the molar ratio of an alkali metal oxide and silica is 3.8 or lower, with a fine particle silicon oxide (D) and subsequently adjusting the molar ratio of the alkali metal oxide and silica to be in a range of 3.9 to 7.0.

As the alkali metal silicate, a widely commercially available alkali metal silicate in a liquid form can be used, and specific examples thereof include those in which the molar ratio of an alkali metal oxide and silica is 3.8 or lower, such as water glass Nos. 1, 2 and 3, calcium silicate solutions, and lithium silicate solutions. These alkali metal silicates may be used singly, or in combination of two or more thereof.

The fine particle silicon oxide (D) is not particularly restricted, and a fine particle silicon oxide whose particles contain a silanol group partially or on their surfaces and have an average particle size of 100 nm or smaller can be preferably used. More specific examples of the fine particle silicon oxide (D) include spherical silicon oxides, such as SNOWTEX C, SNOWTEX CS, SNOWTEX CM, SNOWTEX 0, SNOWTEX OS, SNOWTEX OM, SNOWTEX NS, SNOWTEX N, SNOWTEX NM, SNOWTEX S, SNOWTEX 20, SNOWTEX 30, and SNOWTEX 40 (which are manufactured by Nissan Chemical Corporation), as well as ADELITE AT-20N, ADELITE AT-20A, and ADELITE AT-20Q (which are manufactured by ADEKA Corporation); non-spherical (chainlike or flaky) silicon oxides, such as SNOWTEX UP, SNOWTEX OUP, SNOWTEX PS-S, SNOWTEX PS-SO, SNOWTEX PS-M, SNOWTEX PS-MO, SNOWTEX PS-L, and SNOWTEX PS-LO (which are manufactured by Nissan Chemical Corporation); silicon oxides produced by combustion-oxidation of silicon chloride in the air, such as AEROSIL 50, AEROSIL 130, AEROSIL 200, AEROSIL 300, AEROSIL 380, AEROSIL TT600, AEROSIL MOX80, and AEROSIL MOX170 (which are manufactured by Nippon Aerosil Co., Ltd.); and alkoxysilane hydrolysates, such as tetramethoxysilane and tetraethoxysilane. These silicon oxides may be used singly, or in combination of two or more thereof.

The temperature at which the alkali metal silicate, in which the molar ratio of an alkali metal oxide and silica is 3.8 or lower, and the fine particle silicon oxide (D) are mixed is not particularly restricted, however, it is usually in a range of 20° C. to 80° C., preferably in a range of 35° C. to 70° C., more preferably in a range of 50° C. to 65° C. Further, the molar ratio ($SiO_2/M_2O$) of silica to the alkali metal oxide in the compound and/or mixture (A) obtained by mixing the above-described raw materials is usually in a range of 3.9 to 7.0, preferably in a range of 3.9 to 6.0, more preferably in a range of 4.0 to 5.5, particularly preferably in a range of 4.1 to 5.0.

<Stabilized Zirconium Oxide (B)>

The surface treatment agent of the present embodiment contains a stabilized zirconium oxide (B). The stabilized zirconium oxide (B) is zirconium oxide stabilized with a stabilizer, such as zirconium oxide stabilized with an oxide selected from CaO, $Y_2O_3$, MgO, $CeO_2$, $Sc_2O_3$, and $HfO_2$. More specific examples of the stabilized zirconium oxide (B) include stabilized zirconium oxides in which one or more oxides selected from CaO, $Y_2O_3$, MgO, $CeO_2$, $Sc_2O_3$ and $HfO_2$ are solid-dissolved in zirconium oxide, and these stabilized zirconium oxides which are further stabilized with an addition of $Al_2O_3$, TiO, $Ta_2O_5$, $Nb_2O_5$ or the like as a dispersion enhancer.

The stabilized zirconium oxide (B) is incorporated such that the ratio (metal oxides other than $ZrO_2$)/($ZrO_2$) of a total mass of metal oxides other than zirconium oxide to the mass of zirconium oxide, is preferably in a range of 0.01 to 1, more preferably in a range of 0.02 to 0.43, particularly preferably in a range of 0.04 to 0.33. Examples of the metal oxides other than zirconium oxide include mixtures containing one or more oxides selected from CaO, $Y_2O_3$, MgO, $CeO_2$, $Sc_2O_3$, and $HfO_2$.

A method of producing the stabilized zirconium oxide (B) is not particularly restricted, and examples thereof include a method in which a solution obtained by dissolving a zirconium salt and a salt containing a stabilizer element in water and wet-mixing is added to aqueous ammonia, and the resulting precipitates are subsequently filtered, washed with water and then fired to obtain a stabilized zirconium oxide.

Examples of the zirconium salt include zirconium nitrate and zirconium hydroxide. Examples of the salt containing a stabilizer element include nitrates and hydroxides of CaO, $Y_2O_3$, MgO, $CeO_2$, $Sc_2O_3$, $HfO_2$, and the like.

The firing temperature is not particularly restricted, however, it is preferably about 800 to 1,450° C. By performing the firing in this temperature rage, a fine stabilized zirconium oxide can be obtained.

The stabilized zirconium oxide obtained after the firing may be pulverized to adjust the average particle size. The average particle size is preferably in a range of 0.1 μm to 10 μm, more preferably in a range of 0.2 μm to 5 μm, particularly preferably in a range of 0.3 μm to 2 μm. As for a method of measuring the average particle size, for example, the measurement can be performed by a known particle size distribution analysis method such as a laser diffraction-scattering method.

A more preferred mode of the stabilized zirconium oxide (B) is, for example, a mode in which the stabilized zirconium oxide (B) contains $CeO_2$ as a stabilizer, and the mass ratio ($CeO_2/ZrO_2$) of $CeO_2$ to zirconium oxide ($ZrO_2$) is preferably in a range of 0.01 to 1.0, more preferably in a range of 0.02 to 0.43, particularly preferably in a range of 0.04 to 0.33. It is also possible to use a composite oxide obtained by adding one or more selected from CaO, SrO, BaO, $Y_2O_3$, $La_2O_3$, $Ce_2O_3$, $Pr_2O_3$, $Nb_2O_3$, $Sc_2O_3$, $Eu_2O_3$, $Gd_2O_3$, $Tb_2O_3$, $Dr_2O_3$, $Ho_2O_3$, $Er_2O_3$, $Yb_2O_3$, PbO, $WO_3$, $MoO_3$, $V_2O_5$, $Ta_2O_5$, and $Nb_2O_5$ to $CeO_2$. The composite oxide is desirably a combination of cerium oxide and yttria.

The content of the stabilized zirconium oxide (B) in the surface treatment agent is not particularly restricted, however, the ratio (BM/AM) of the mass (BM) of the stabilized zirconium oxide (B) to the mass (AM) of the compound and/or mixture (A) is preferably in a range of 0.08 to 0.5, more preferably in a range of 0.16 to 0.37, still more preferably in a range of 0.17 to 0.31.

<Component (C)>

The surface treatment agent of the present embodiment contains a component (C) that contains at least one selected from metal oxide particles and clay minerals. It is noted here that the component (C) does not contain any substance corresponding to the above-described compound and/or mixture (A) or stabilized zirconium oxide (B).

A component constituting the metal oxide particles is not particularly restricted, and examples thereof include aluminum oxide, silicon oxide, silicates, phosphates, oxoacid salts, iron oxide, magnesium oxide, zinc oxide, titanium oxide, and complexes of these materials.

Examples of the clay minerals include layered clay minerals having a layered structure in which a large number of sheets are formed in a laminated manner. The layered clay minerals are, for example, layered silicate minerals. The layer-forming sheets may be tetrahedral sheets constituted by silicon and oxygen, or octahedral sheets containing aluminum and/or magnesium.

Specific examples of the clay minerals (layered clay minerals) include smectites, such as montmorillonite, bentonite, beidellite, hectorite, and saponite; vermiculites; micas, such as illite, muscovite, phlogopite, and biotite; brittle micas, such as margarite and clintonite; chlorites such as sudoite; kaolins, such as kaolinite and halloysite; and serpentines such as antigorite. These clay minerals may be naturally-occurring or synthetic clay minerals, and any one of these clay minerals may be used singly, or two or more thereof may be used in combination.

In the present embodiment, as the component (C), it is also possible to use an intercalation compound (e.g., pillared crystal) in which a guest compound is incorporated between layers of a layered clay mineral (host), a layered clay mineral in which ions contained between layers are exchanged with other ions, or a layered clay mineral that has been subjected to a surface treatment (e.g., a surface treatment with a silane coupling agent, or a complex treatment by a combination of a surface treatment with a silane coupling agent and a surface treatment with an organic binder).

As the component (C), any one of the above-described compounds may be used singly, or two or more thereof may be used in combination.

The average particle size of the component (C) is not particularly restricted, however, it is preferably in a range of 0.05 μm to 15 μm, more preferably in a range of 0.1 μm to 10 μm, still more preferably in a range of 0.2 μm to 5 μm. When the component (C) has a rectangular shape, the aspect ratio thereof (long-side length/short-side length) is preferably in a range of 10 to 100, more preferably in a range of 20 to 80, still more preferably in a range of 30 to 60.

As for a method of measuring the average particle size, for example, the measurement can be performed by a known particle size distribution analysis method such as a laser diffraction-scattering method. Further, the aspect ratio can be measured by observation under an electron microscope and, in the calculation of the aspect ratio, an average value is taken for preferably at least 50 samples, more preferably at least 100 samples.

The content of the component (C) in the surface treatment agent is not particularly restricted, however, the ratio (CM/AM) of the mass (CM) of the component (C) to the mass (AM) of the compound and/or mixture (A) is preferably in a range of 0.08 to 0.5, more preferably in a range of 0.16 to 0.37, still more preferably in a range of 0.17 to 0.31.

The surface treatment agent may contain a solvent to dissolve or disperse the components [components (A) to (C)] for the formation of a film, and/or to adjust the concentration of the components.

The solvent is not particularly restricted as long as it is water or a mixture of water and a water-miscible organic solvent (a mixture containing not less than 50% by volume of water based on the volume of aqueous medium). The water-miscible organic solvent is not particularly restricted as long as it is miscible with water, and examples thereof include ketone-based solvents, such as acetone and methyl ethyl ketone; amide-based solvents, such as N,N'-dimethylformamide and dimethylacetamide; alcohol-based solvents, such as methanol, ethanol, and isopropanol; ether-based solvents, such as ethylene glycol monobutyl ether and ethylene glycol monohexyl ether; and pyrrolidone-based solvents, such as 1-methyl-2-pyrrolidone and 1-ethyl-2-pyrrolidone. These water-miscible organic solvents may be mixed with water singly, or in combination of two or more thereof.

The content of the solvent is preferably in a range of 30% by mass to 90% by mass, more preferably in a range of 40% by mass to 80% by mass, with respect to a total mass of the surface treatment agent.

When water (e.g., deionized water) is used as the solvent, the pH of the surface treatment agent is preferably in a range of 6.0 to 11.0, more preferably in a range of 8.0 to 10.0, with a pH of 9.0 being the median value.

For pH adjustment, a pH modifier such as ammonia, carbonic acid, nitric acid, or an organic acid can be used.

The surface treatment agent may also contain a surfactant.

The species of the surfactant is not particularly restricted and, for example, an anionic surfactant, a nonionic surfactant, or a cationic surfactant can be used.

A method of producing the surface treatment agent is not particularly restricted, and the surface treatment agent can be produced by, for example, adding prescribed amounts of the above-described components [e.g., compound and/or mixture (A), stabilized zirconium oxide (B), and component (C)] to a prescribed solvent, further adding other components such as a pH modifier and a surfactant as required, and then mixing the added materials.

Alternatively, the surface treatment agent may be produced by adding the stabilized zirconium oxide (B), the component (C) and the like to an aqueous solution containing a surfactant and water, stirring this aqueous solution to prepare a dispersion, and subsequently adding the compound and/or mixture (A) to the dispersion. It is noted here that components other than the surfactant, such as a pH modifier, may be added to the dispersion, or may be added to the surface treatment agent to which the compound and/or mixture (A) has been added.

A metal material coated with a surface treatment film can be produced by using the above-described surface treatment agent. More specifically, a metal material coated with a surface treatment film can be produced by contacting the above-described surface treatment agent with the surface of a metal material and thereby forming a film.

The species of the metal material to which the surface treatment agent is applied is not particularly restricted, and the surface treatment agent can be applied to metal materials such as iron-based metal materials, zinc-plated steel sheets, aluminum-based metal materials, magnesium-based metal materials, nickel-based metal materials, titanium-based metal materials, zirconium-based metal materials, copper-based metal materials, and tin-based metal materials. These metal materials may also contain a component other than a metal. The surface treatment agent for metal materials according to the present embodiment can be particularly preferably applied to metal materials for electronics that are used in electronic components and microdevice components. In the following descriptions of a surface treatment method, a base material to be treated is a metal material for electronics, however, the material to which the surface treatment agent for metal materials according to the present embodiment is applied is not restricted thereto.

A method of contacting the surface treatment agent with the surface of a metal material is not particularly restricted as long as, for example, the surface treatment agent for metal materials can be uniformly subjected to contact with the surface of the metal material, and examples of the method include roll coating, immersion coating, and spray coating.

The drying temperature for drying the film formed on the metal material surface is not particularly restricted, however, it is usually 80° C. or higher, preferably 100° C. or higher, more preferably 150° C. or higher, but usually 300° C. or lower, preferably 250° C. or lower, more preferably 220° C. or lower. The drying time is also not particularly restricted, however, it is usually 1 minute or longer, preferably 5 minutes or longer, but usually 60 minutes or shorter, preferably 30 minutes or shorter. Further, the drying method is not particularly restricted, and the metal surface treatment agent may be dried by heating in the atmospheric environment using a hot-air or induction heater, or with infrared ray, near-infrared ray or the like. The heating time is as described above, and optimum conditions are selected as appropriate in accordance with, for example, the dimensions (plate width and plate thickness) of the metal material being used, the speed of the processing line, and the species of the compounds contained in the metal surface treatment agent.

The mass of the film that is attached after the contact of the surface treatment agent for metal materials with the metal material surface and the subsequent drying is not particularly restricted, however, it is preferably 0.1 to 50 $g/m^2$, more preferably 0.5 to 20 $g/m^2$, still more preferably 2.0 to 10 $g/m^2$. The film on the metal material surface may cover the entirety of the metal material surface, and the film may be adhered to the metal material surface at least partially as long as the effects of the present invention are exerted.

On the film formed by the surface treatment agent for metal materials, an upper-layer film may be further formed. The upper-layer film can be formed by applying a surface treatment agent for the upper-layer film and drying. The surface treatment agent for the upper-layer film is preferably one which is used as a coating-type surface treatment agent. The upper-layer film is provided mainly for the purpose of imparting superior electrical insulation to a metal material. The surface treatment agent for the upper-layer film is preferably a silicone resin, more preferably a methyl phenyl silicone resin. Further, as required, the surface treatment agent for the upper-layer film may contain, for example, a color pigment, a rust preventive pigment, a functional pigment having thermal conductivity, or the like. The heating temperature for drying a film can be formed into the upper-layer film is preferably 300° C. or lower, more preferably 280° C. or lower. The thickness of the upper-layer film is preferably 1 to 100 μm, more preferably 5 to 30 μm.

In the method of producing a metal material coated with a surface treatment film according to the present embodiment, before contacting the surface treatment agent with the metal material, the surface of the metal material may be subjected to a pretreatment as required for the purpose of removing oil, dirt, polishing residue and the like from the surface of the metal material. By performing the pretreatment, the surface of the metal material can be cleaned and brought into a state of being easily wettable in a uniform manner. A method of this pretreatment is not particularly restricted, and examples thereof include hot-water washing, solvent washing, alkali degreasing, and acid pickling. The pretreatment step may be omitted when the surface of the metal material has no oil, dirt, polishing residue or the like and is already in a state of being easily wettable in a uniform manner.

In the above-described manner, according to the present embodiment, a film which not only comprehensively satisfies various performance such as corrosion resistance, adhesion and water resistance but also exhibits excellent corrosion resistance and adhesion even when exposed to a high-temperature environment can be formed on the surface of a metal material or the like, and this consequently enables to use the metal material over an extended period.

EXAMPLES

The actions and effects of the present invention will now be described concretely by way of Examples. The below-described Examples do not restrict the present invention by any means, and design modifications made in accordance with changes in the conditions are included in the technical scope of the present invention.

(Production of Test Plate)

A test plate production method will now be described. First, the following commercially available material was prepared as a sample material.

(i) Cold-Rolled Steel Sheet SPCC-SD: Sheet Thickness 0.8 mm

The surface of the sample material was treated with FINE CLEANER E6406 (concentration: 20 g/L) manufactured by Nihon Parkerizing Co., Ltd. to remove oil and dirt from the surface. Next, after washing the surface with tap water and confirming that the surface was wetted 100%, pure water was further poured over the sample material, and this sample material was dried at 100° C. to remove water from the surface, whereby a test plate was obtained.

(Preparation of Surface Treatment Agents)

In accordance with the respective mass ratios (blending ratios) shown in Table 1, the components were mixed with water to obtain surface treatment agents. The thus obtained surface treatment agents had a solid concentration of 25%. Further, the surface treatment agents were each adjusted to have a pH of 9 with aqueous ammonia, nitric acid or the like.

The components that are indicated by symbols in the "species" columns of Table 1 were prepared as described below.

In Table 1, the values under "% by mass" each represent a ratio with respect to a total solid content mass of the respective surface treatment agents. In Table 1, the values under "BM/AM" each represent a ratio of the mass (BM) of the stabilized zirconium oxide (B) to the mass (AM) of the compound and/or mixture (A). In Table 1, the values under "CM/AM" each represent a ratio of the mass (CM) of the component (C) to the mass (AM) of the compound and/or mixture (A).

TABLE 1

|  | compound and/or mixture (A) | | stabilized zirconium oxide (B) | | | component (C) | | |
| --- | --- | --- | --- | --- | --- | --- | --- | --- |
|  | species | mass % | species | mass % | $B_M/A_M$ | species | mass % | $C_M/A_M$ |
| Example 1 | a5 | 42.8 | b4 | 28.6 | 0.67 | c4 | 28.6 | 0.67 |
| Example 2 | a5 | 53.8 | b4 | 23.1 | 0.43 | c4 | 23.1 | 0.43 |
| Example 3 | a5 | 59.1 | b4 | 20.5 | 0.35 | c4 | 20.5 | 0.35 |
| Example 4 | a5 | 66.7 | b4 | 16.7 | 0.25 | c4 | 16.7 | 0.25 |
| Example 5 | a5 | 73.9 | b4 | 13 | 0.18 | c4 | 13 | 0.18 |
| Example 6 | a5 | 78.6 | b4 | 10.7 | 0.14 | c4 | 10.7 | 0.14 |
| Example 7 | a5 | 87.5 | b4 | 6.3 | 0.07 | c4 | 6.3 | 0.07 |
| Example 8 | a5 | 91.2 | b4 | 4.4 | 0.05 | c4 | 4.4 | 0.05 |
| Example 9 | a5 | 76.8 | b4 | 4 | 0.05 | c4 | 19.2 | 0.25 |
| Example 10 | a5 | 75.3 | b4 | 5.9 | 0.08 | c4 | 18.8 | 0.25 |
| Example 11 | a5 | 71.1 | b4 | 11.1 | 0.16 | c4 | 17.8 | 0.25 |
| Example 12 | a5 | 70.6 | b4 | 11.8 | 0.17 | c4 | 17.7 | 0.25 |
| Example 13 | a5 | 64 | b4 | 20 | 0.31 | c4 | 16 | 0.25 |
| Example 14 | a5 | 61.5 | b4 | 23.1 | 0.38 | c4 | 15.4 | 0.25 |
| Example 15 | a5 | 57.1 | b4 | 28.6 | 0.50 | c4 | 14.3 | 0.25 |
| Example 16 | a5 | 50 | b4 | 37.5 | 0.75 | c4 | 12.5 | 0.25 |
| Example 17 | a5 | 76.8 | b4 | 19.2 | 0.25 | c4 | 4 | 0.05 |
| Example 18 | a5 | 75.3 | b4 | 18.8 | 0.25 | c4 | 5.9 | 0.08 |
| Example 19 | a5 | 71.1 | b4 | 17.8 | 0.25 | c4 | 11.1 | 0.16 |
| Example 20 | a5 | 70.6 | b4 | 17.7 | 0.25 | c4 | 11.8 | 0.17 |
| Example 21 | a5 | 64 | b4 | 16 | 0.25 | c4 | 20 | 0.31 |
| Example 22 | a5 | 61.5 | b4 | 15.4 | 0.25 | c4 | 23.1 | 0.38 |
| Example 23 | a5 | 57.1 | b4 | 14.3 | 0.25 | c4 | 28.6 | 0.50 |
| Example 24 | a5 | 50 | b4 | 12.5 | 0.25 | c4 | 37.5 | 0.75 |
| Example 25 | a2 | 66.7 | b4 | 16.7 | 0.25 | c4 | 16.7 | 0.25 |
| Example 26 | a3 | 66.7 | b4 | 16.7 | 0.25 | c4 | 16.7 | 0.25 |
| Example 27 | a4 | 66.7 | b4 | 16.7 | 0.25 | c4 | 16.7 | 0.25 |
| Example 28 | a6 | 66.7 | b4 | 16.7 | 0.25 | c4 | 16.7 | 0.25 |
| Example 29 | a7 | 66.7 | b4 | 16.7 | 0.25 | c4 | 16.7 | 0.25 |
| Example 30 | a8 | 66.7 | b4 | 16.7 | 0.25 | c4 | 16.7 | 0.25 |
| Example 31 | a5 | 66.7 | b1 | 16.7 | 0.25 | c4 | 16.7 | 0.25 |
| Example 32 | a5 | 66.7 | b2 | 16.7 | 0.25 | c4 | 16.7 | 0.25 |
| Example 33 | a5 | 66.7 | b3 | 16.7 | 0.25 | c4 | 16.7 | 0.25 |
| Example 34 | a5 | 66.7 | b5 | 16.7 | 0.25 | c4 | 16.7 | 0.25 |
| Example 35 | a5 | 66.7 | b6 | 16.7 | 0.25 | c4 | 16.7 | 0.25 |
| Example 36 | a5 | 66.7 | b7 | 16.7 | 0.25 | c4 | 16.7 | 0.25 |
| Example 37 | a5 | 66.7 | b8 | 16.7 | 0.25 | c4 | 16.7 | 0.25 |
| Example 38 | a5 | 66.7 | b9 | 16.7 | 0.25 | c4 | 16.7 | 0.25 |
| Example 39 | a5 | 66.7 | b10 | 16.7 | 0.25 | c4 | 16.7 | 0.25 |
| Example 40 | a5 | 66.7 | b11 | 16.7 | 0.25 | c4 | 16.7 | 0.25 |
| Example 41 | a5 | 66.7 | b12 | 16.7 | 0.25 | c4 | 16.7 | 0.25 |
| Example 42 | a5 | 66.7 | b13 | 16.7 | 0.25 | c4 | 16.7 | 0.25 |
| Example 43 | a5 | 66.7 | b14 | 16.7 | 0.25 | c4 | 16.7 | 0.25 |
| Example 44 | a5 | 66.7 | b4 | 16.7 | 0.25 | c1 | 16.7 | 0.25 |
| Example 45 | a5 | 66.7 | b4 | 16.7 | 0.25 | c2 | 16.7 | 0.25 |
| Example 46 | a5 | 66.7 | b4 | 16.7 | 0.25 | c3 | 16.7 | 0.25 |
| Example 47 | a5 | 66.7 | b4 | 16.7 | 0.25 | c5 | 16.7 | 0.25 |
| Example 48 | a5 | 66.7 | b4 | 16.7 | 0.25 | c6 | 16.7 | 0.25 |
| Example 49 | a5 | 66.7 | b4 | 16.7 | 0.25 | c7 | 16.7 | 0.25 |
| Example 50 | a5 | 66.7 | b4 | 16.7 | 0.25 | c8 | 16.7 | 0.25 |
| Example 51 | a5 | 66.7 | b4 | 16.7 | 0.25 | c9 | 16.7 | 0.25 |
| Example 52 | a5 | 66.7 | b4 | 16.7 | 0.25 | c10 | 16.7 | 0.25 |

TABLE 1-continued

|  | compound and/or mixture (A) | | stabilized zirconium oxide (B) | | component (C) | | |
|---|---|---|---|---|---|---|---|
|  | species | mass % | species | mass % | | species | mass % | $C_M/A_M$ |
| Example 53 | a5 | 66.7 | b4 | 16.7 | 0.25 | c11 | 16.7 | 0.25 |
| Example 54 | a5 | 66.7 | b4 | 16.7 | 0.25 | c12 | 16.7 | 0.25 |
| Example 55 | a5 | 66.7 | b4 | 16.7 | 0.25 | c13 | 16.7 | 0.25 |
| Comparative Example 1 | — | — | b4 | 50 | — | c4 | 50 | — |
| Comparative Example 2 | a5 | 80 | — | — | — | c4 | 20 | 0.25 |
| Comparative Example 3 | a5 | 80 | b4 | 20 | 0.25 | — | — | — |
| Comparative Example 4 | — | — | — | — | — | c4 | 100 | — |
| Comparative Example 5 | — | — | b4 | 100 | — | — | — | — |
| Comparative Example 6 | a5 | 100 | — | — | — | — | — | — |
| Comparative Example 7 | a1 | 66.7 | b4 | 16.7 | 0.25 | c4 | 16.7 | 0.25 |
| Comparative Example 8 | a9 | 66.7 | b4 | 16.7 | 0.25 | c4 | 16.7 | 0.25 |

<Compound and/or Mixture (A): Production of a1 to a9>

Alkali metal silicate-containing compounds and/or mixtures were prepared such that the respective molar ratios of $SiO_2$ and $M_2O$ shown in Table 2 were attained.

TABLE 2

| code | molar ratio of $SiO_2/M_2O$ | compound and/or mixture |
|---|---|---|
| a1 | 1.0 | mixture of potassium silicate and $K_2O$ |
| a2 | 1.8 | mixture of potassium silicate and $K_2O$ |
| a3 | 3.1 | potassium silicate |
| a4 | 3.9 | mixture of potassium silicate and AEROSIL 200 |
| a5 | 4.1 | mixture of potassium silicate and AEROSIL 200 |
| a6 | 6.0 | mixture of potassium silicate and AEROSIL 200 |
| a7 | 6.5 | mixture of potassium silicate and AEROSIL 200 |
| a8 | 7.0 | mixture of potassium silicate and AEROSIL 200 |
| a9 | 8.0 | mixture of potassium silicate and AEROSIL 200 |

<Stabilized Zirconium Oxide (B): Production of b1 to b14>

Zirconium hydroxide was pulverized to an average particle size of 1.0 μm using a wet mill, and the thus pulverized zirconium hydroxide was wet-mixed with cerium hydroxide using a wet mill at an oxide-based mass ratio ($ZrO_2:CeO_2$) of 85:15. Subsequently, the resulting slurry was dried, fired at 1,000° C. for 3 hours, and then pulverized to obtain a component b1 having an average particle size of 0.1 μm. Further, components b2 to b14 having the respective average particle sizes and ratios ($ZrO_2:CeO_2$) shown in Table 3 were produced by appropriately changing the pulverization time and the blending ratio of zirconium hydroxide and cerium hydroxide (yttrium hydroxide for b14).

TABLE 3

| code | average particle size (μm) | stabilizer species | $CeO_2/ZrO_2$ |
|---|---|---|---|
| b1 | 0.10 | $CeO_2$ | 0.18 |
| b2 | 0.20 | $CeO_2$ | 0.18 |
| b3 | 0.30 | $CeO_2$ | 0.18 |
| b4 | 0.75 | $CeO_2$ | 0.18 |
| b5 | 2.00 | $CeO_2$ | 0.18 |
| b6 | 5.00 | $CeO_2$ | 0.18 |
| b7 | 10.0 | $CeO_2$ | 0.18 |
| b8 | 0.75 | $CeO_2$ | 0.01 |
| b9 | 0.75 | $CeO_2$ | 0.02 |
| b10 | 0.75 | $CeO_2$ | 0.04 |
| b11 | 0.75 | $CeO_2$ | 0.33 |
| b12 | 0.75 | $CeO_2$ | 0.43 |
| b13 | 0.75 | $CeO_2$ | 1.0 |
| b14 | 0.75 | $Y_2O_3$ | 0.18* |

*$Y_2O_3/ZrO_2$ with respect to b14

<Component (C): Production of c1 to c13>

Kaolin clay was added to deionized water, and the solid concentration was adjusted to be 20% by mass. Thereafter, the resultant was pulverized using a DYNO-MILL to obtain a component c1 having an average particle size of 0.05 μm and an aspect ratio of 40. Further, components c2 to c13 having the respective average particle sizes and aspect ratios shown in Table 4 were produced by appropriately changing the pulverization conditions.

TABLE 4

| code | average particle size (μm) | aspect ratio |
|---|---|---|
| c1 | 0.05 | 40 |
| c2 | 0.1 | 40 |
| c3 | 0.2 | 40 |
| c4 | 4.0 | 40 |
| c5 | 5.0 | 40 |
| c6 | 10.0 | 40 |
| c7 | 15.0 | 40 |
| c8 | 4.0 | 10 |
| c9 | 4.0 | 20 |
| c10 | 4.0 | 30 |
| c11 | 4.0 | 60 |

TABLE 4-continued

| code | average particle size (μm) | aspect ratio |
|------|---------------------------|--------------|
| c12  | 4.0                       | 80           |
| c13  | 4.0                       | 100          |

The thus obtained surface treatment agents of Examples 1 to 55 and Comparative Examples 1 to 8 were each applied to the surface of the test plate by a bar-coating method and subsequently dried at 200° C. for 10 minutes without being washed with water, whereby test plates having 3 g/m² of a film on each side (test plates coated with films) were obtained. For the thus obtained test plates coated with films, the following evaluation tests were conducted.

(Evaluation Test Methods)

(1) Corrosion Resistance

For each of the test plates coated with films, a corrosion resistance test was conducted in accordance with JIS C60068-2-66:2001 at a temperature of 110° C. and a humidity of 85%, and the time required for 5% (area ratio) of the immersed film to be discolored was evaluated.
- ◎: 120 hours or longer
- ○: 48 hours to less than 120 hours
- Δ: 24 hours to less than 48 hours
- ×: less than 24 hours (2) Adhesion On each of the test plates coated with films, in accordance with JIS K5400:1990, cuts were made on the film using a cutter in a 1 mm-square grid form (100 cells: 10 cells×10 cells), and a tape was pasted thereto, after which the tape was removed, and the number of the film cells that were not peeled off was measured to evaluate the ratio of the remaining cells as residual ratio.
- ◎: residual ratio=91 to 100%
- ○: residual ratio=71 to 90%
- Δ: residual ratio=51 to 70%
- ×: residual ratio=0 to 50%

(3) Water Resistance

The test plates coated with films were each immersed in 50° C. warm water, and the time required for 5% (area ratio) of the immersed film to be discolored was evaluated.
- ◎: 120 hours or longer
- ○: 48 hours to less than 120 hours
- Δ: 24 hours to less than 48 hours
- ×: less than 24 hours (4) Corrosion Resistance and Adhesion after Exposure to High-Temperature Environment The test plates coated with films were heated in an oven at 600° C. for 500 hours and then left to stand at 25° C. for 24 hours. Thereafter, these test plates were tested in the same manner as in the above-described tests for (1) Corrosion Resistance and (2) Adhesion.

(5) Alkali Resistance

The test plates coated with films were each immersed in a 5% aqueous NaOH solution, and the outer appearance was evaluated after 0.5 hours.
- ◎: no change and no peeling
- ○: slight discoloration but no peeling
- Δ: discoloration but no peeling
- ×: partial peeling.

(6) Solvent Resistance

The test plates coated with films were each immersed in methyl ethyl ketone, and the outer appearance was evaluated after 24 hours.
- ◎: no change
- ○: a slight change
- Δ: discoloration
- ×: partial peeling For the test plates coated with films that were obtained using the respective surface treatment agents of Examples 1 to 55 and Comparative Examples 1 to 8, the results of conducting the above-described evaluations (1) to (6) are shown in Table 5.

It is noted here that, from the practical standpoint, a film is required to have an evaluation of "Δ", "○" or "◎" in each of the above-described evaluation items.

TABLE 5

|            | corrosion resistance | adhesion | water resistance | after heating test corrosion resistance | adhesion | alkali resistance | solvent resistance |
|------------|----------------------|----------|------------------|------------------------------------------|----------|-------------------|--------------------|
| Example 1  | Δ | ○ | ○ | Δ | ○ | ○ | Δ |
| Example 2  | ○ | ◎ | ◎ | Δ | ◎ | ◎ | Δ |
| Example 3  | ◎ | ◎ | ◎ | ◎ | ◎ | ◎ | ◎ |
| Example 4  | ◎ | ◎ | ◎ | ◎ | ◎ | ◎ | ◎ |
| Example 5  | ◎ | ◎ | ◎ | ◎ | ◎ | ◎ | ◎ |
| Example 6  | ○ | ◎ | ◎ | Δ | ◎ | ◎ | Δ |
| Example 7  | Δ | ◎ | ◎ | Δ | ◎ | ◎ | Δ |
| Example 8  | Δ | ○ | ○ | Δ | ○ | ○ | Δ |
| Example 9  | ○ | ○ | ○ | Δ | ○ | ○ | ◎ |
| Example 10 | ○ | ◎ | ◎ | Δ | ◎ | ◎ | ◎ |
| Example 11 | ◎ | ◎ | ◎ | ○ | ◎ | ◎ | ◎ |
| Example 12 | ◎ | ◎ | ◎ | ◎ | ◎ | ◎ | ◎ |
| Example 13 | ◎ | ◎ | ◎ | ◎ | ◎ | ◎ | ◎ |
| Example 14 | ◎ | ◎ | ◎ | ○ | ◎ | ◎ | ◎ |
| Example 15 | ○ | ◎ | ◎ | Δ | ◎ | ◎ | ◎ |
| Example 16 | Δ | ○ | ○ | Δ | ○ | ○ | ◎ |
| Example 17 | ○ | ○ | ○ | ○ | ○ | ○ | Δ |
| Example 18 | ○ | ◎ | ◎ | ◎ | ◎ | ◎ | Δ |
| Example 19 | ◎ | ◎ | ◎ | ◎ | ◎ | ◎ | ○ |
| Example 20 | ◎ | ◎ | ◎ | ◎ | ◎ | ◎ | ◎ |
| Example 21 | ◎ | ◎ | ◎ | ◎ | ◎ | ◎ | ◎ |
| Example 22 | ◎ | ◎ | ◎ | ◎ | ◎ | ◎ | ○ |
| Example 23 | ○ | ◎ | ◎ | ◎ | ◎ | ◎ | Δ |
| Example 24 | Δ | ○ | ○ | ○ | ○ | ○ | Δ |
| Example 25 | Δ | ◎ | ◎ | ◎ | ◎ | ◎ | ◎ |
| Example 26 | ○ | ◎ | ◎ | ◎ | ◎ | ◎ | ◎ |

TABLE 5-continued

| | after heating test | | | | | | |
|---|---|---|---|---|---|---|---|
| | corrosion resistance | adhesion | water resistance | corrosion resistance | adhesion | alkali resistance | solvent resistance |
| Example 27 | ◎ | ◎ | ◎ | ◎ | ◎ | ◎ | ◎ |
| Example 28 | ◎ | ◎ | ◎ | ◎ | ◎ | ◎ | ◎ |
| Example 29 | ○ | ◎ | ◎ | ◎ | ◎ | ◎ | ◎ |
| Example 30 | Δ | ◎ | ◎ | ◎ | ◎ | ◎ | ◎ |
| Example 31 | ◎ | Δ | ◎ | ◎ | Δ | ◎ | ◎ |
| Example 32 | ◎ | ○ | ◎ | ◎ | ○ | ◎ | ◎ |
| Example 33 | ◎ | ◎ | ◎ | ◎ | ◎ | ◎ | ◎ |
| Example 34 | ◎ | ◎ | ◎ | ◎ | ◎ | ◎ | ◎ |
| Example 35 | ◎ | ○ | ◎ | ◎ | ○ | ◎ | ◎ |
| Example 36 | ◎ | Δ | ◎ | ◎ | Δ | ◎ | ◎ |
| Example 37 | ◎ | ◎ | ◎ | Δ | ◎ | ◎ | ◎ |
| Example 38 | ◎ | ◎ | ◎ | ○ | ◎ | ◎ | ◎ |
| Example 39 | ◎ | ◎ | ◎ | ◎ | ◎ | ◎ | ◎ |
| Example 40 | ◎ | ◎ | ◎ | ◎ | ◎ | ◎ | ◎ |
| Example 41 | ◎ | ◎ | ◎ | ○ | ◎ | ◎ | ◎ |
| Example 42 | ◎ | ◎ | ◎ | Δ | ◎ | ◎ | ◎ |
| Example 43 | ◎ | ◎ | ◎ | Δ | ◎ | ◎ | ◎ |
| Example 44 | ◎ | Δ | ◎ | ◎ | Δ | ◎ | ◎ |
| Example 45 | ◎ | ○ | ◎ | ◎ | ○ | ◎ | ◎ |
| Example 46 | ◎ | ◎ | ◎ | ◎ | ◎ | ◎ | ◎ |
| Example 47 | ◎ | ◎ | ◎ | ◎ | ◎ | ◎ | ◎ |
| Example 48 | ◎ | ○ | ◎ | ◎ | ○ | ◎ | ◎ |
| Example 49 | ◎ | Δ | ◎ | ◎ | Δ | ◎ | ◎ |
| Example 50 | ◎ | ◎ | ◎ | ◎ | ◎ | ◎ | Δ |
| Example 51 | ◎ | ◎ | ◎ | ◎ | ◎ | ◎ | ○ |
| Example 52 | ◎ | ◎ | ◎ | ◎ | ◎ | ◎ | ◎ |
| Example 53 | ◎ | ◎ | ◎ | ◎ | ◎ | ◎ | ◎ |
| Example 54 | ◎ | ◎ | ◎ | ◎ | ◎ | ◎ | ○ |
| Example 55 | ◎ | ◎ | ◎ | ◎ | ◎ | ◎ | Δ |
| Comparative Example 1 | X | X | X | X | X | X | X |
| Comparative Example 2 | ○ | ○ | ○ | X | X | ○ | ○ |
| Comparative Example 3 | ○ | ○ | ○ | ○ | ○ | X | ○ |
| Comparative Example 4 | X | X | X | X | X | X | X |
| Comparative Example 5 | X | X | X | X | X | X | X |
| Comparative Example 6 | ○ | ○ | X | X | X | X | ○ |
| Comparative Example 7 | X | ○ | X | X | ○ | ○ | ◎ |
| Comparative Example 8 | X | ○ | X | X | ○ | ○ | ◎ |

The invention claimed is:

1. A surface treatment agent for metal materials, comprising:
    a compound and/or mixture (A) represented by $M_2O \cdot SiO_2$, wherein a molar ratio of $SiO_2/M_2O$ is in a range of 1.8 to 7.0 and M represents an alkali metal;
    a stabilized zirconium oxide (B);
    a component (C) that comprises at least one selected from metal oxide particles and clay minerals except for the compound and/or mixture (A) and the stabilized zirconium oxide (B), and
    a solvent, wherein
    a content of the compound and/or mixture (A) is in a range of 42.8% by mass to 87.5% by mass with respect to a total solid content of the surface treatment agent,
    a ratio (BM/AM) of a mass (BM) of the stabilized zirconium oxide (B) to a mass (AM) of the compound and/or mixture (A) is in a range of 0.08 to 0.5,
    a ratio (CM/AM) of a mass (CM) of the component (C) to the mass (AM) is in a range of 0.08 to 0.5, and
    a content of the solvent is in a range of 40% by mass to 80% by mass with respect to a total mass of the surface treatment agent.

2. The surface treatment agent for metal materials according to claim 1, wherein
    the stabilized zirconium oxide (B) comprises $CeO_2$ as a stabilizer, and
    a mass ratio ($CeO_2/ZrO_2$) of $CeO_2$ to zirconium oxide ($ZrO_2$) is in a range of 0.01 to 1.0.

3. The surface treatment agent for metal materials according to claim 1, wherein a molar ratio of $SiO_2/M_2O$ in the compound and/or mixture (A) is in a range of 3.9 to 6.0.

4. A metal material coated with a surface treatment film, comprising a film formed by contacting the surface treatment agent for metal materials according to claim 1 with the surface of the metal material.

5. A method of producing a metal material coated with a surface treatment film, the method comprising a step of attaching a film formed from the surface treatment agent for metal materials according to claim 1 to a metal material.

* * * * *